(12) United States Patent
Vero et al.

(10) Patent No.: US 7,785,474 B2
(45) Date of Patent: Aug. 31, 2010

(54) METHOD FOR CONTACTING LIQUID WITH ION EXCHANGE RESIN

(75) Inventors: Gregory Mark Vero, Camberwell (AU); Colin Bruce Ritchie, Nar Nar Goon (AU); Abigail Holmquist, St. Kilda (AU)

(73) Assignee: Orica Australia Pty Ltd, Melbourne, Victoria (AU)

( * ) Notice: Subject to any disclaimer, the term of this patent is extended or adjusted under 35 U.S.C. 154(b) by 518 days.

(21) Appl. No.: 11/721,430

(22) PCT Filed: Dec. 15, 2005

(86) PCT No.: PCT/AU2005/001901

§ 371 (c)(1), (2), (4) Date: Sep. 20, 2007

(87) PCT Pub. No.: WO2006/063405

PCT Pub. Date: Jun. 22, 2006

(65) Prior Publication Data

US 2009/0277834 A1 Nov. 12, 2009

Related U.S. Application Data

(60) Provisional application No. 60/636,221, filed on Dec. 15, 2004.

(51) Int. Cl.
*B01D 15/00* (2006.01)
(52) U.S. Cl. .................... 210/661; 210/667; 210/695; 210/802; 210/265
(58) Field of Classification Search ................ 210/661, 210/667, 695, 802, 265
See application file for complete search history.

(56) References Cited

U.S. PATENT DOCUMENTS

| | | | |
|---|---|---|---|
| 4,889,624 A | 12/1989 | Soriente et al. | |
| 5,230,805 A | 7/1993 | Yates et al. | |
| 5,900,146 A | 5/1999 | Ballard et al. | |
| 6,171,489 B1 | 1/2001 | Ballard et al. | |
| 6,416,668 B1 | 7/2002 | Al-Samadi | |
| 6,669,849 B1 | 12/2003 | Nguyen et al. | |
| 7,291,272 B2 | 11/2007 | Bourke et al. | |
| 2003/0127379 A1 | 7/2003 | De Bruijn et al. | |
| 2005/0274674 A1 | 12/2005 | Mueller et al. | |

FOREIGN PATENT DOCUMENTS

| | | |
|---|---|---|
| EP | 0 864 344 | 9/1998 |
| GB | 822856 | 11/1962 |
| GB | 1029084 | 5/1966 |
| WO | WO 02/20121 | 3/2002 |
| WO | WO 02/088027 | 11/2002 |
| WO | WO 2004/073830 | 9/2004 |
| WO | PCT/AU2004/000432 | 10/2004 |
| WO | PCT/AU2005/000419 | 9/2005 |
| WO | PCT/AU2005/000618 | 11/2005 |
| WO | PCT/AU2005/001111 | 2/2006 |
| WO | PCT/AU2005/001426 | 3/2006 |
| WO | WO 2006/063404 | 6/2006 |
| WO | WO 2006/063406 | 6/2006 |

*Primary Examiner*—Chester T Barry
(74) *Attorney, Agent, or Firm*—Greenlee, Winner and Sullivan, P.C.

(57) ABSTRACT

The invention provides a method for contacting liquid with an ion exchange resin comprising introducing liquid into a process tank containing ion exchange resin at an inlet (2) and removing liquid that has been contacted with resin from the process tank at an outlet, the outlet being located above the inlet (2), the process tank including a resin containment region (7, 9) disposed between the inlet (2) and the outlet to impede the upward flow of the resin as it becomes entrained in the liquid flowing from the inlet to the outlet, and a contactor region for promoting contact between the resin and the liquid located below the containment region (7, 9), said containment region (7, 9) containing an array of settling members through which the liquid and resin upflow and which impede the flow of the resin to a sufficient extent that it is substantially contained within or below the containment region (7, 9). Apparatus for performing this method is also provided.

15 Claims, 5 Drawing Sheets

METHOD FOR CONTACTING LIQUID WITH ION EXCHANGE RESIN

CROSS-REFERENCE TO RELATED APPLICATIONS

This application is the United States National Stage application under 35 U.S.C. §371 of International Application No. PCT/AU2005/001901, filed Dec. 15, 2005, which claims the benefit of U.S. Provisional Patent Application 60/636,221, filed Dec. 15, 2004, both of which are hereby incorporated by reference to the extent not inconsistent with the disclosure herewith.

FIELD OF THE INVENTION

The present invention relates to devices, processes and systems for contacting ion exchange resins with liquids and containing the resins within a region. The system is especially useful in relation to the production of potable water and treatment of effluent.

BACKGROUND

Magnetic ion exchange resins have been used to remove various compounds from water supplies and waste streams. The resins are used to remove and concentrate a compound or compounds from a stream, and in some cases, move the compound into another stream. The term "compound" includes chemical compounds, elements and ions.

Ion exchange resins work by having functional groups incorporated within a polymer backbone which bind to compounds present within a solution to be treated. The functional groups can be selected so to provide binding sites suitable for binding to various types of compounds present within a solution. Weak acid cationic ion exchange resins are suitable for separating transition metal ions. Acidic organic materials, such as dissolved organic carbon (DOC) including humic and fulvic acids and other negatively charged ions, will bind to anion ion exchange resins. The binding effectiveness of the resin decreases as the compounds use up available binding sites on the resin. The spent resin is regenerated by applying a regenerate wash solution to the resin to reform the binding sites. Treatment with a regenerant solution produces a wash solution containing the separated compounds.

For ease of handling traditional ion exchange resins are contained within columns and the solution to be treated is pumped through the column. This restricts the types of processes in which the resin can be used.

Magnetic ion exchange resins are a significant improvement over traditional ion exchange resins. These resins have a discrete magnetic core or have magnetic particles dispersed throughout the resin. MIEX® brand resin from Orica Australia Pty Ltd is a macroporous ion-exchange resin having magnetic particles dispersed throughout the resin and is particularly suitable for use in removing DOC from potable water supplies. It has an advantage over other types of magnetic resins as all parts of the resin contain magnetic particles.

As described in U.S. Pat. No. 6,669,849, magnetic ion exchange resins can be used in the treatment of potable water supplies to remove DOC. It can be used as part of a multi-step treatment process and can provide a number of benefits in addition to the direct removal of DOC. For example, some water treatment processes employ activated carbon as a final polishing treatment to alleviate problems with taste and/or odour, to remove disinfection by-products or to remove any other pollutants. Pre-treatment with MIEX resin may also extend the effective life of the activated carbon.

Magnetic ion exchange resin can also be used in the treatment of waste streams. For example the Kraft process produces a highly coloured black effluent which is often released into water ways. Resin may be used to remove the colouring compounds from the effluent waste stream. Resin can also be used to remove and concentrate heavy metals from waste streams for additional processing.

A benefit of using magnetic ion exchange resins is that the weak magnetic properties of the resin allow the resin particles or beads to agglomerate together and quickly settle in settling tanks. This can facilitate the separation of resin from solution and thereby improve the methods of removing, recycling and regenerating resin. This has removed the need for columns to contain the resin and has permitted new treatment arrangements and methods for regenerating the resin, and continuous flow systems.

Processes for the use and separation of resins in the treatment of potable water are known and some have been described in U.S. Pat. No. 6,669,849. Magnetic ion exchange resins are described in U.S. Pat. Nos. 5,900,146 and 6,171,489. Other applications and patents relating to magnetic resins include International Application Nos. PCT/AU2005/001111, PCT/AU2005/000419, PCT/AU2004/000432, PCT/AU2005/000618, PCT/AU2005/001426 and U.S. application Ser. No. 11/124,624. The contents of these documents are incorporated by cross-reference.

There are a number of known methods for contacting and subsequently separating the magnetic ion exchange resins from a contacted liquid. The resin can be added to a contactor tank containing resin to which there is an inflow of raw water and an outflow of treatment water and resin. The resin may be dispersed by mechanical agitation such as stirrers and the like, mixing pumps immersed in the water or air agitation where a gas is bubbled through the water. Sufficient shear needs to be imparted on the water to achieve dispersal of the resin.

The resin then needs to be recovered from the water. The ion-exchange resin tends to be denser than the water and can settle to the bottom of the tank and can be separated by gravity settling. Alternatively the resin and water mixture can be pumped up through a separate resin settling tank. Such settling tanks are typically an upright elongate tank into which flows the stream of liquid and resin, the stream flows upward within the tank with the liquid being removed at the top. Resin agglomerates within the tank and gravity settled, and is then removed via an outlet located at or near the base of the tank.

U.S. Pat. No. 6,669,849 also describes a process for contacting and separating the ion-exchange resin from water flowing though a basin whereby the resin contacts the water in a first part of the basin and bulk of resin particles settle out in the first quarter of a separating basin length which is devoid of settler modules ("free-flowing" settling). Further removal of resin particles ("enhanced" settling) from treated water is performed in a settler compartment filled with modules which may be either tilted plates or tubular modules. The bottom of the settler is designed for collection of resin particles in cylindrical, conical or pyramidal hoppers from which the resin particles are pumped back to the contactor region.

Basin systems or separate contactor and separator tanks require a large amount of space and can significantly increase the capital cost of using a magnetic ion exchange resin process.

Another option is to confine the resin within a localised region. U.S. Pat. No. 5,230,805 (Yates et al) describes a system of magnetically stabilised fluidised particles within liquid media. Fluidised magnetic resin within an upwardly flowing liquid stream is stabilised and held within a general area by the application of a magnetic field of 25 to 500 gauss, preferably by an electromagnet that encircles the treatment area. This arrangement requires the ongoing application of a strong magnetic field to retain the resin beads within a contact region and it is unlikely that the resin could be economically retained within the region at moderate to high liquid upflow rates.

SUMMARY OF THE INVENTION

It has now been found that it is possible to combine the functions of a resin contactor and settler in a single upright process tank in a liquid upflow arrangement and retain a substantial proportion of the resin within the tank by using an array of settling members within the tank. This is an unexpected finding as resin tends to become entrained in the liquid flow and outflow with the outflowing liquid from the tank.

Throughout this specification, and the claims that follow, resin includes whole resin beads, damaged resin beads and the portions or particles of resin separated from resin beads.

In an embodiment of the invention there is provided a method for contacting liquid with an ion exchange resin comprising introducing liquid into a process tank containing ion exchange resin at an inlet and removing liquid that has been contacted with resin from the process tank at an outlet, the outlet being located above the inlet, the process tank including a resin containment region disposed between the inlet and the outlet to impede the upward flow of resin as it becomes entrained in the liquid flowing from the inlet to the outlet, and a contactor region for promoting contact between the resin and the liquid located below the containment region, said containment region containing an array of settling members through which the liquid and resin upflow and which impede the flow of the resin to a sufficient extent that it is substantially contained within or below the containment region.

In particular embodiments the settling members are inclined and preferably are lamella plates, inclined plates, and/or settling tubes.

Preferably the process tank includes one or more additional arrays of settling members within the containment region upstream from the first mentioned array of settling members and which assist in containing the resin within or below the containment region.

Preferably the resin has a density greater than the liquid, preferably at least 10% greater, more preferably at least 15% greater than the liquid. Preferably the liquid is water.

In particular embodiments the resin has a mean particle size of from 50 to 500 microns, more preferably from 100 to 300 micron and most preferably 150 to 250 microns.

This size range provides an ion-exchange resin which can be dispersed in the water and which is suitable for subsequent separation from the water. The size of the resins affects the kinetics of adsorption of DOC and the effectiveness of separation. The optimal size range for a particular application may be readily determined by simple experimentation.

Preferably the resin is magnetic ion exchange resin. In this embodiment it is preferred for the settling members to be inclined and arranged to promote agglomeration of the magnetic ion exchange resin. In particular it is preferred that the arrangement of inclined settling members (eg. lamella plates) is such that eddy currents are produced in the vicinity of the members which cause the resin particles to move in a way that promotes agglomeration under the influence of the magnetic attraction of the particles. Without wishing to be limited by theory it is believed that this enhanced agglomeration contributes to the significant containment of magnetic resin within the containment region. More preferably the magnetic ion exchange resin is MIEX® brand resin from Orica Australia Pty, most preferably MIEX®DOC resin.

It is preferred that the ion-exchange resin is macroporous. This provides the resins with a substantially large surface area onto which the DOC can be adsorbed.

In a further embodiment the method includes an additional step of capturing any residual resin entrained by the resin-contacted liquid. In an embodiment this is achieved by passing the resin-contacted liquid which has flowed through the containment region through a magnetic field provided by permanent magnets located within a stream of the liquid. The capturing step can occur within the process tank or, more preferably, on a stream of liquid flowing from the outlet. It is preferred that this method also includes a step of releasing any resin retained by the magnetic field of the permanent magnets and collecting the released resin.

Preferably, according to this embodiment the residual magnetic resin is separated from the liquid stream from the outlet by locating a contact surface within the stream, having permanent magnets located behind the contact surface which provide a magnetic field that extends though the contact surface and into the stream and which is capable of attracting and retaining magnetic resin onto the contact surface and where the magnetic field can be reduced or removed in response to an actuation means so as to release resin retained on the contact surface. Preferably the magnetic field is reduced or removed by moving the magnet away from the stream contact surface.

More preferably, according to this embodiment the residual resin separating process is as described in the co-pending PCT application filed by the same applicant and entitled Magnetic Resin Separator and filed on 15 Dec. 2005.

In a further embodiment the method is combined with a resin regeneration process whereby the process tank is in fluid communication with resin regeneration system. At least a portion of the resin from the process tank is passed into the regeneration system, regenerated and then returned to a process tank. The resin can be collected from a separate outlet of the process tank and/or captured from an optional magnetic separator located in the outflowing stream of resin contacted liquid.

In a further embodiment the combined contactor and settler tank forms part of a series of such tanks. The first tank is as earlier described but the outflow of the tank flows into the inlet of another process tank. The outflow of the other tank may be collected or may flow through additional process tanks before being collected.

The apparatus described above is also novel and represents a further aspect of the invention. Accordingly, in another aspect the invention provides apparatus for contacting liquid with an ion exchange resin comprising a process tank for containing ion exchange resin, said tank having a liquid inlet to allow liquid to enter the process tank and an outlet for allowing resin contacted liquid to flow out of the process tank, the outlet being located above the inlet, wherein the process tank has a resin containment region disposed between the inlet and the outlet to impede upward flow of resin as it becomes entrained in liquid flowing from the inlet to the outlet, and a contactor region located below the containment region for promoting contact between the resin and the liquid, said containment region containing an array of settling members through which liquid and resin can upflow and which at one or more combinations of liquid flow rate and resin concentration act to impede the flow of resin to a sufficient extent that it is substantially contained within or below the containment region.

BRIEF DESCRIPTION OF THE FIGURES

The invention will now be further described with reference to the following drawing.

DETAILED DESCRIPTION OF THE INVENTION

Figure 1:
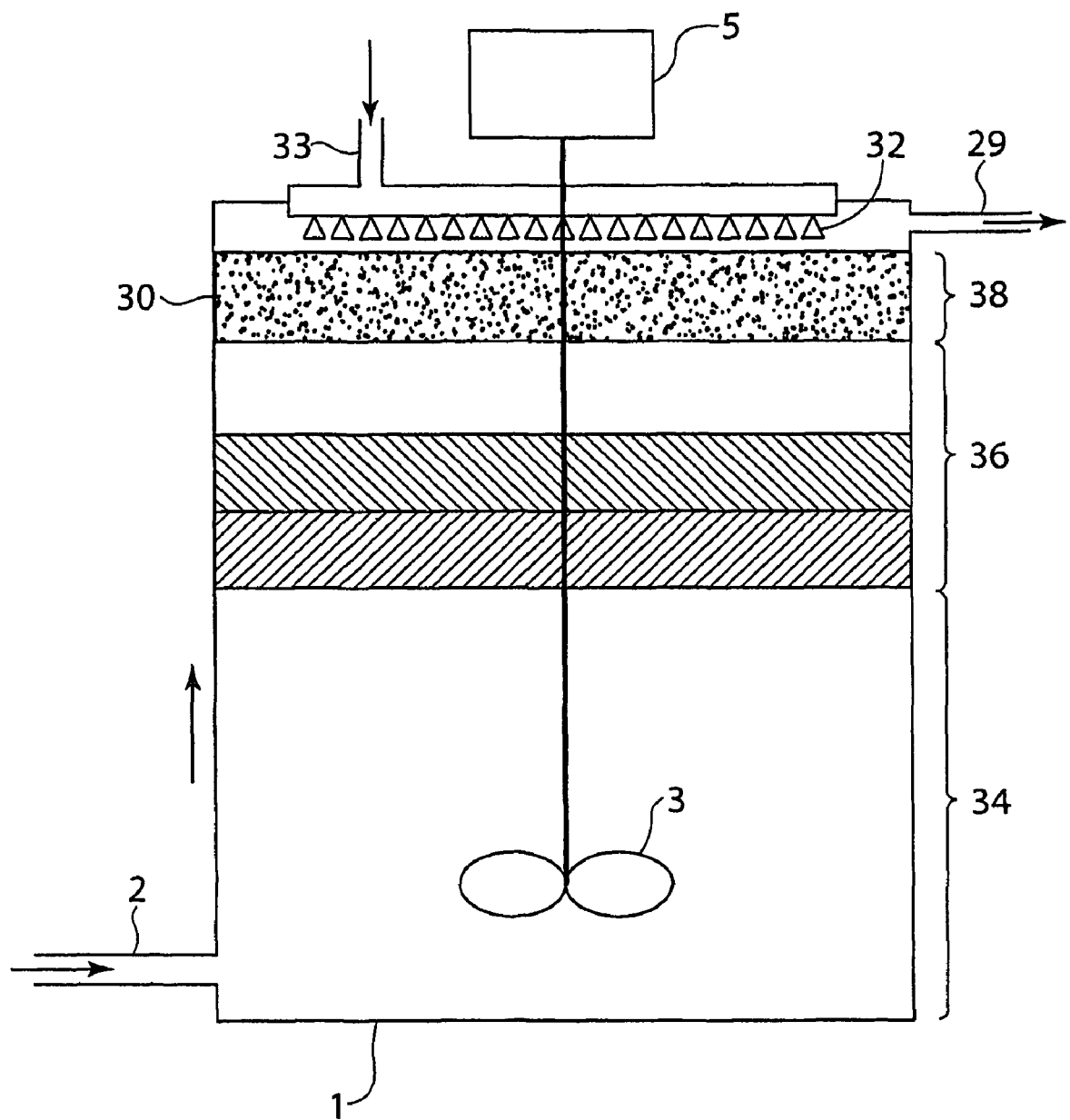
FIG. 1 is a schematic diagram of a combined contactor and settler tank and residual resin separator for use in a potable water treatment system. The separator has a layer of particulate magnetic material.

FIG. 1 depicts a basic concept system containing an integrated contactor and settler and residual resin separator for use with raw water and MIEX® DOC resin.

The overall system has a resin contacting region (34), a first stage settling region (36) and a residual resin separator/water polisher (38). The system comprises a tank (1) with a raw water inlet (2) by which the raw water is added to the tank. The arrowheads show the direction of the fluid flow. The tank (1) includes an agitator (3) connected to a motor (5) for use in dispersing resin within the incoming stream of raw water. Resin is also located within tank section (34) and additional resin may be added to that section via the raw water inlet (2) or another inlet in that section (not shown).

In use most of the resin should be contained within the contacting region (34). The resin treated water and some resin will rise upward as raw water is pumped into the bottom part of the tank and will flow upward through the settling members in region (36). The magnetic resin agglomerates and settles, falling downward, against the upward flow of water, back into the contactor section of tank. Various resin settler members could be used to facilitate settling such as tube or plate settlers. The test system used lamella plate array.

The water continues upwards past the settling members into the magnetic separator/water polisher region (38). As the water flows upward it flows through a bed of particulate magnetite (30), although other types of magnetic material could be used. Magnetite particles have an average particle size of 1.5 to 6 mm or 6 to 10 mm have been found to be effective at capturing any residual resin, including resin fines, remaining in the contacted water.

A single layer of magnetite or two (or more) layers having different particle sizes may be used. If multiple layers are used, it is preferred for the lower layers to have magnetite of a larger average particle size than the upper layers of magnetite.

Finally, the polished water reaches the top of the container, where it leaves the system via outlet (29).

The system is fitted with water spray nozzles (32), connected to rinse water pipes (33), for use in removing resin captured in the bed (30). When the bed is to be cleaned, the system can be taken offline and water would be pumped through the nozzles (32) through the bed. The wash water and resin would then be collected from the settler and the washed off resin beads recycled by being returned to the contactor region. The resin fines may be sent to waste. As alternatives to using the process tank to contain the wash water and washed resin, a capture container could be moved into position under the bed and used to collect the washed off resin, or magnetite bed (and captured resin) could be removed from the tank for separate washing.

Trials with a test system established that the process could work with magnetic resin, namely MIEX® DOC resin, and at low water upflow rates.

Based on the above concept system, an upflow combined contactor/settler system for use in a test water treatment plant was developed. Such a system may provide significant benefits such as a reduced plant footprint and substantially reduced capital costs. The system used two lamella arrays to retain a substantial portion of the resin within and below a containment region. The portion of the tank from the outlet to the bottom of the lower lamella array can be considered to be the containment region.

It was important to obtain good dispersal of the resin within the process tank so as to satisfactorily treat liquid flowing upwards through the resin whilst also needing to contain a significant proportion of the resin within the process tank. However the resin can be entrained in the flowing liquid and could result in the loss of substantial amounts of resin from the process tank and thereby make the overall process uneconomic. With some arrangements, it was expected that the process tank may need to be over 6 meters tall in order to retain a sufficient quality of the resin within the tank.

There are a number of arrangement by which the liquid can enter the process tank. The liquid could be pumped into the tank at its base via multiple inlets in an arrangement similar to a shower head. However, this arrangement can significantly increase the cost of the system and may not be possible with some pre-existing tanks and may be prone to blockages depending on the nature of the inflowing liquid. Blockages can be a significant problem if the liquid is raw water sourced from dams and the like as it may contain leaf and other plant matter which could block the inlets.

A lower cost alternative is to use one or more large inlets located about the sides of the tank. Such arrangements are significantly less expensive and can be retrofitted to most existing types of treatment tanks used in water treatment installations. Whilst such inlets are less prone blockages the inflowing liquid can cause significant eddy currents within the tank. Although such currents can be useful in dispersing the resin within the contacting region, it can interfere with subsequent efforts to contain and settle the resin.

A favoured inlet system uses a tangential inflow of liquid which is sufficient to disperse the resin at operational flow rates without the need for an agitator. The base of the tank may be configured to enhance the flow by having a conical design. Although this arrangement results in significant eddy currents in the contactor region, the eddy currents are reduced or negated as they pass through the lamella arrays.

Figure 2:
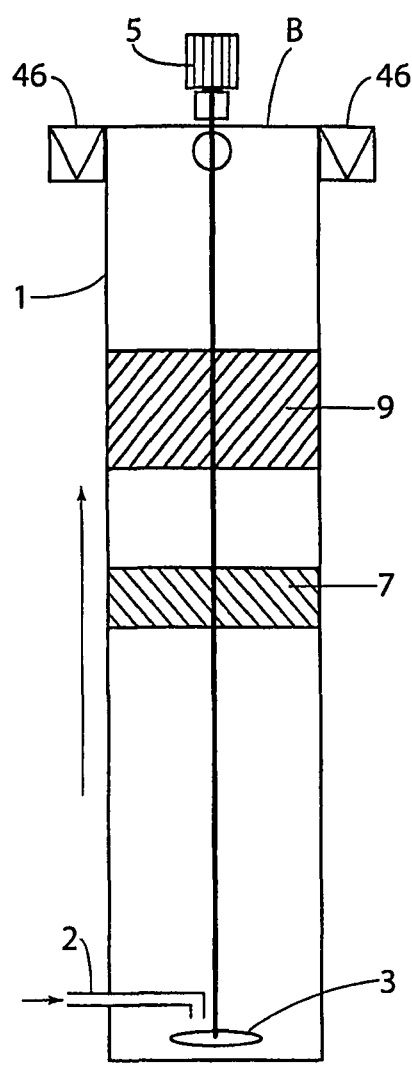
FIG. 2 depicts a side cut away view of a process tank of the invention.
Figure 3:
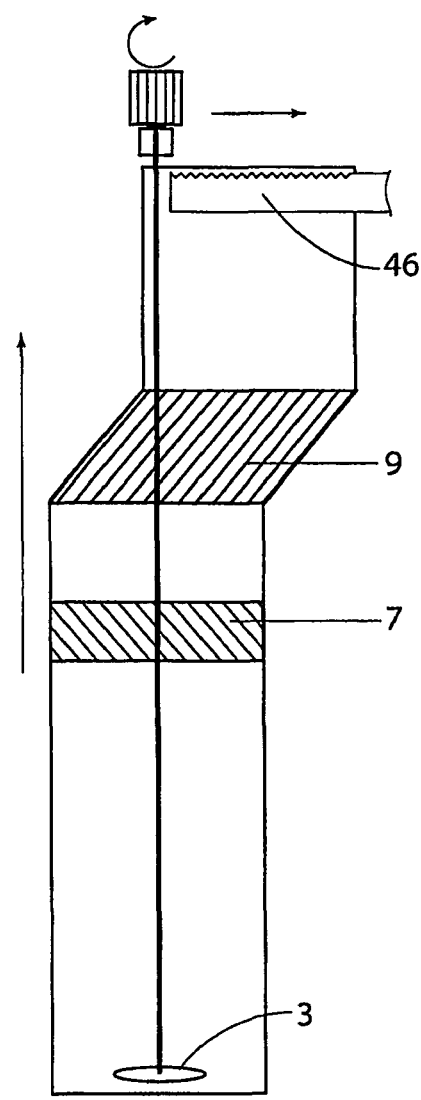
FIG. 3 depicts another side cut away view of the process tank shown in FIG. 2.
Figure 4:
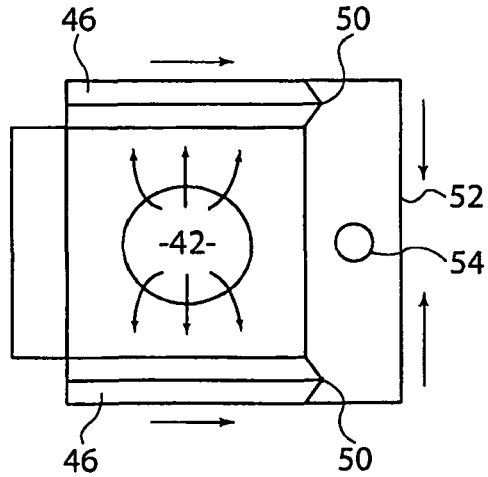
FIG. 4 depicts a top down view of the process tank shown in FIG. 2 including an attached launder assembly.

FIGS. 2, 3 and 4 depict a process tank (1) of the invention. The tank has 0.36 m² cross-sectional area (600 mm sides) and is approximately 2.6 m in height. It includes an inlet pipe (2), an agitator (3) connected to a motor (5), and two lamella plate arrays, a lower containment array (7) and an upper array (9).

The tank includes an outlet (42), at the top of the tank which is a feedwell for two "v" notch launders (46). The resin contacted water (and any residual resin) flows out through the outlet, onto the spill surface 44 which is inclined so as to direct the flow into the launders (46). The launders are also inclined and direct the flow through the launder outlets (50) into the collection trough (52) which collects the launder flow. The trough includes an outlet (54) from which outflows the treated water. The outflowing water may be subject to further treatment steps as required.

The inflowing water enters the tank in the resin contact region. The region comprises the portion of the tank from the base to the lower containment lamella plate array (7) and is approximately 1800 mm in height. The resin used in the process tank was MIEX® DOC resin, a magnetic ion exchange resin from Orica Australia and useful from removing DOC from water. The magnetic nature of the resin facilitates the agglomeration and settling of the resin but can result in a poor dispersal of resin within the inflowing water due to its tendency to settle at the bottom of the tank. The agitator is used to keep the resin dispersed within the contacting region at low flow rates. At higher flow rates the force of the inflowing water can be sufficient to disperse the resin.

The lower containment plate array (7) comprises a series of lamella plates, each 250 mm in length, with 35 mm spacing and set at a 60 degree angle (from the horizontal). The height of the array is 217 mm. This array acts to contain or return most of the resin within the below contacting region. It also helps to control eddy currents present in the tank caused by the motion of the inflowing liquid.

The upper plate array (9) is spaced approximately 380 mm above the top of the lower array and comprises a series of lamella plates, each 510 mm in length, with 50 mm spacing and set at a 60 degree angle (from the horizontal). The height of the array is 442 mm. This array can settle and return resin present in the upflowing stream that may have otherwise escaped the process tank.

The top of the tank contains the outlet and is located approximately 660 mm above the upper plate array.

In use the system may be combined with a magnetic resin separator (not shown) to recover any resin still present in the outflowing water. The magnetic resin separator could be included in the launders themselves or in container in fluid communication with the collector trough outlet (54). The outflowing water can be passed through a column of particulate magnetite or over columns containing moveable permanent magnets to capture the residual resin. Useful resin capture and release systems are described in the co-pending PCT application filed by the same applicant and entitled Magnetic Resin Separator and filed on 15 Dec. 2005, the contents of which are incorporated by cross-reference. The recovered resin can be returned to the process tank.

As an alternative to using a resin capture system, the outflowing water can be passed through a membrane filter. The filter can be used to contain all of the resin within the tank whilst allowing the resin contacted water (or other liquid) to pass. The array of settling members are still required to contain most of the resin below the membrane. The membrane can also act to further treat the liquid passing through the filter. Membrane filtration is a relatively expensive process and there can be cost advantages by first treating the liquid with ion exchange resin before the liquid contacts a membrane filter in addition to the advantage of preventing resin loss from the process tank.

The tests were also conducted to evaluate the performance of the above 0.36 m² process tank (referred to as an "expanded bed contactor") when fitted with two different configurations of the lower containment lamella plate array. The fitting of a lamella plate array into a cubic area causes design problems as either the entire cross section area can not be utilized or the upward flowing liquid may bypass the lamella array.

Figure 5:
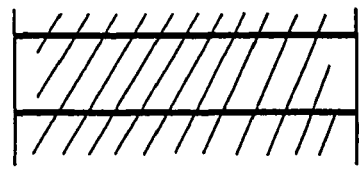
FIG. 5 is a side view of a design of a lamella plate array. It is shown within a section of the process tank.
Figure 6:
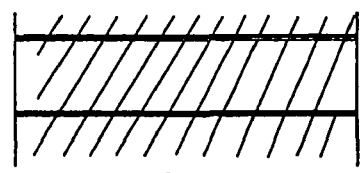
FIG. 6 is a side view of a different design of a lamella plate array. It is shown within a section of the process tank.

Two design options were tested for the containment lamella array. The first arrangement is depicted in FIG. 5, and utilizes the entire cross section area of the tank for upward flow but allows bypassing of the lamella array at the two ends. The second arrangement is depicted in FIG. 6. The final plate is extended to the side of the contactor thereby reducing bypassing but also constricting the upward flow by reducing the working area by 21%.

The results of the tests indicated that there was a difference in overall performance between the two arrangements, with the first arrangement performing better overall. The reduction in the working area with the second design was therefore more detrimental than allowing bypassing. However, the difference was not substantial. At greater scales this would not be expected to occur as the percentage of the area lost due to enclosing the end of the array would not be as great, however it did highlight the importance of the working area of lamella arrays.

The tests were used to determine the operational performance of the expanded bed contactor at flow rates of 10, 15, 20, 25, 30, 35 and 40 m/h; resin plume concentrations of 75, 100, 125, 150, 175, 200, 225, 250 and 275 mL/L and at low, medium and high agitation rates (30, 60 and 90 RPM).

The process tank was fitted with the first design of the containment lamella array (see FIG. 5). The expanded bed contactor and associated tanks were then filled with town water. A recycle pump was used to return the outflowing stream to the tank inlet pipe and the flow through the contactor region was adjusted to between 2 and 5 m³/h. The desired quantity (50 litres of settled resin) of MIEX® DOC resin (batch 05-2109—10% fines reduced) was then added to the expanded bed contactor to achieve a fully expanded resin plume concentration of 75 mL/L. A fully expanded plume has a height of 1800 mm (ie the height of the contact region). The flow rate was then adjusted to 10 m/h and the agitator started and adjusted to 90 RPM. After 30 minutes the plume height and flow rate was recorded.

A photograph of the containment plates and region above the plates was taken if the resin plume reaches the confinement lamella array for subsequent visual inspection. Samples were also taken from four sample points on the side of the expanded bed contactor to determine resin concentrations and the sampled resin was returned.

The agitation speed was adjusted to 60 and then 30 RPM and the resin plume height and flow rate was recorded after 30 minutes. Photos and samples were taken if the resin plume reached the confinement array. The tests were repeated at increasing flow rates (5 m/h intervals) until 35 m/h was reached or were stopped earlier if an extreme amount of resin penetrated the containment lamella array.

The agitation was ceased and the resin plume height and flow rate was recorded after 30 minutes at an up flow rate 5 m/h above the last rate tested.

The flow through the contactor was adjusted to between 2 and 5 m³/h and more resin (15 litres) was added to increase the resin concentration of the fully expanded plume by 25 mL/L. The flow rate was then adjusted to 10 m/h and the agitator started and adjusted to 90 RPM and above tests repeated. This test was further repeated as increased resin concentrations until the fully expanded plume concentration reached 200 mL/L.

The above procedures were repeated with the second design (FIG. 6). The desired quantity of MIEX®DOC resin (batch 05-2109—10% fines reduced) (65 litres of settled resin) was added to the expanded bed contactor to achieve a fully expanded plume concentration (at 1800 mm) of 100 mL/L. The test procedures were repeated in accordance with the earlier methods until the fully expanded plume concentration reached 275 mL/L.

A resin concentration of greater than 10 mL/L in the region above the lower containment lamella array was used to define a breakthrough event. However the upper lamella array seemed to be able to function adequately to control those situations where this rate was exceeded.

The performance tests indicated that it was possible to operate the above expanded bed contactor having two lamella plate arrays over a wide range of inventory resin concentrations within the tank, agitation rates and water flow rates. The designs of the tested containment lamella array were not considered to be optimal and limited the upper operational ranges. However, it is considered that the results were sufficient to encompass the typical operational ranges expected in water treatment plants and allow for a fair margin for operational variations or errors.

It was noted that when conditions were such that the resin plume just reached the lower containment array very little penetration into containment array occurred. However as the drivers of plume expansion increased so did the penetration into the array. Typically for every 5 m/h increase in flow rate the penetration into the array increased by about 100 mm which suggests that it may be beneficial to increase the plate length in the lower array. Similar outcomes occurred as a result of increased agitation and plume resin concentration, however interface turbulence and time lag between comparative experiments, respectively, made such observations less obvious.

Once breakthrough has occurred, a 5 m/h increase in the flow rate, a 25 mL/L increase in plume concentration or a 30 RPM increase in agitation increased the resin concentration above the lower containment array by 100 to 200%. Breakthrough events are therefore reasonably gradual with respect to all three parameters, affording a good operational margin for error so long as a combination of parameters is not increased at once. Alternatively a reduction in any one of the parameters by the margin such as that specified above can be used to offset an increase in one of the other parameters.

The combinations of flow rate, agitation and resin concentrations that resulted in a fully expanded plume, i.e. a plume that extends up to the height of the containment lamella array (1800 mm), and that required to achieve an homogeneous plume were not always the same. However the disparity was always less than 20% difference between the top and the bottom halves of the plume. No such disparity occurred at a resin concentration greater than 200 mL/L.

The flow rate and agitation requirements for the generation of a fully expanded plume and those required to achieve a homogeneous plume are presented in table 1. Resin concentration measurements made at sample points indicated that the bottom half of the bed was always homogeneous whenever a fully expanded plume was achieved. However the resin concentration in the top half of some plumes was up to 20% less than that in the bottom half. A 20% reduction in resin concentration in the top half of the plume should however not pose too much of a concern considering the high resin concentrations involved.

Plumes with resin concentrations less than 200 mL/L required more energy to achieve homogeneous plumes than to achieve expanded ones, whereas above 200 mL/L the energy requirement was the same. Increased agitation was not particularly effective at improving plume homogenization, however increased flow rate was effective.

TABLE 1

Flow rate requirement for full bed expansion (FBE) and that required to achieve a homogeneous bed (HB).

| Plume Concentration | Agitation | | |
|---|---|---|---|
| | 30 RPM | 60 RPM | 90 RPM |
| | Flow rate (m/h) for FBE/HB | | |
| 75 mL/L | 30/30 | 25/30 | 10/20 |
| 100 mL/L | 30/35 | 25/30 | 10/25 |
| 125 mL/L | 30/35 | 25/30 | 15/20 |
| 150 mL/L | 30/35 | 25/30 | 15/20 |
| 175 mL/L | 30/35 | 20/30 | 20/30 |
| 200 mL/L | 25/25 | 20/20 | 20/20 |
| 225 mL/L | 20/25 | 20/20 | 15/15 |
| 250 mL/L | 20/20 | 15/15 | 15/15 |
| 275 mL/L | 20/20 | 15/15 | 15/15 |

It is clear from the above that there is a disparity between the flow rate and the agitation required for full bed expansion (FBE) and that required to achieve a homogeneous bed (HB) is greater at the lower concentrations. No disparity exists at concentrations beyond 200 mL/L. This change would seem to reflect the driver of plume expansion. At low densities turbulence is the main driver of plume expansion and as a result as the energy is dissipated, resin in the upper region of the plume is able to settle. There is however still considerable disturbance at the top of the plume interface which results in a poorly defined interface. At high resin concentrations the energy associated with the incoming water flow and that of the agitation is effectively dispersed in the lower plume and the up flow rate drives plume expansion. As a result the plume interface is relatively free of turbulence and very well defined.

Figure 7:
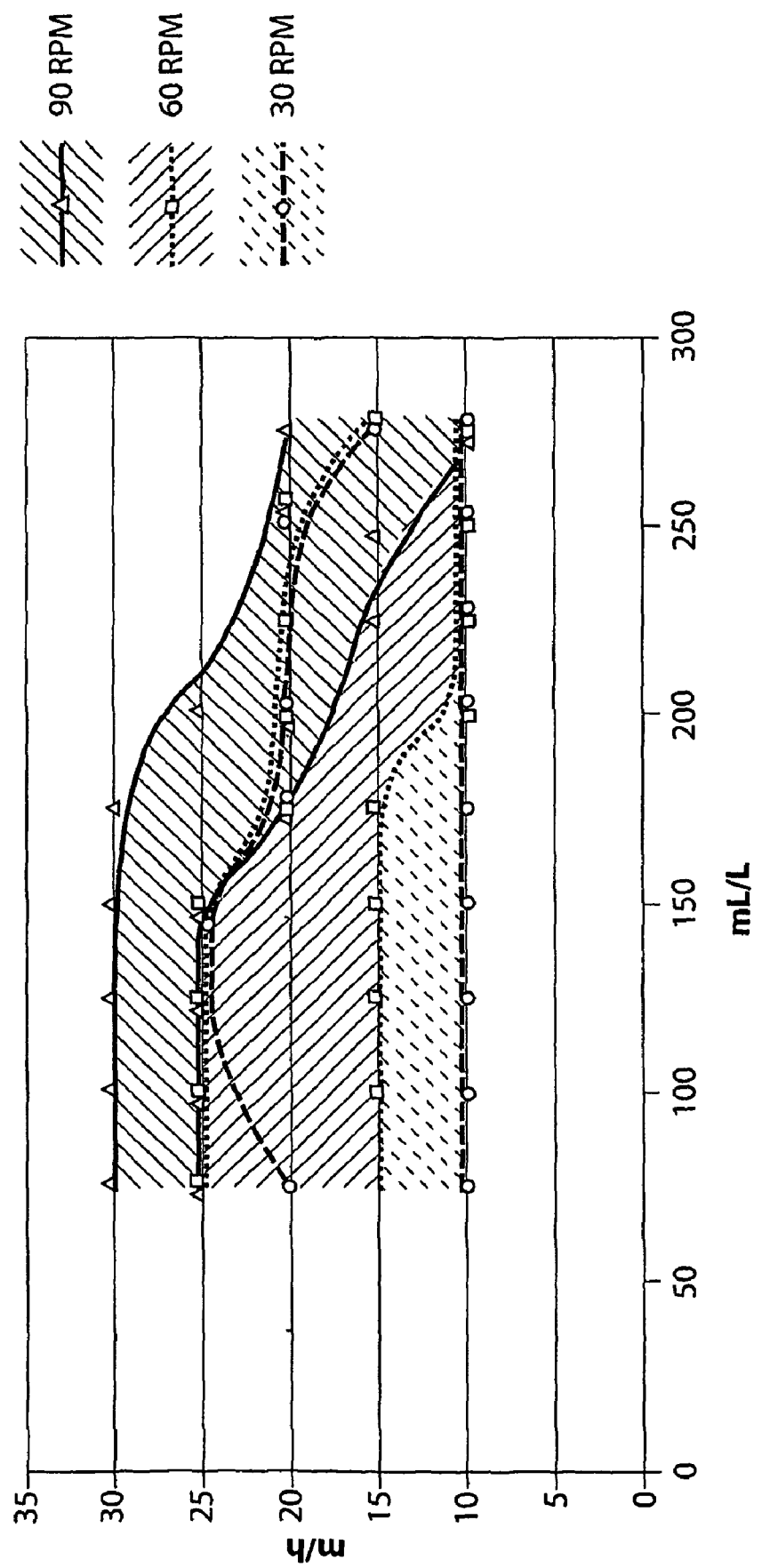
FIG. 7 is a graph of the conditions conducive for good operation of the process tank shown in FIGS. 2 to 4 at three different agitator RPM's. Flowrate (m/h) is plotted against contact solids (mL/L).

The test results gave an indication as to the range of operating conditions for good operation for the tested process tank. The consolidated results are depicted in the graph of FIG. 7. The graph shows flow rate (m/h) verses contact solids (mL/L). The three different shaded zones indicate the preferred operational conditions and the region bounded by lines of the same type represent allowable operation conditions. The minimum tolerance was a resin plume (bed expansion) of 1200 mm. The maximum tolerance was a maximum resin concentration above the lower containment lamella array of 10 mL/L.

In situations where operation over a wide range of agitation rates was possible the preferred operation condition is that with the lowest agitation. The assumption is that providing the least amount of agitation should minimise resin loss, by minimising attrition and by facilitating a more even flow distribution through the lamella arrays.

The optimal operational conditions represented in the graph are specific to many parameters of the process tank, including its overall design (scale, aspect ratio, impellor design/position, etc) and the resin properties (settling rate, fines content, cleanliness, etc). The results can therefore only be used as a guide to the possible operational parameters that might be achieved in different process tanks other than the one used in the above tests.

Tests were also performed using the above 0.36 m² process tank fitted with a single lamella plate array. The tank is as described above with reference to FIGS. 2 and 3, but omitted the lower containment lamella array. The system achieved very low resin loss rates, as low as 0.11 L/ML from the process tank. This loss rate was achieved after 17 days of operation at the optimal operational flow rate for the test resin (25.5 m/h).

These tests indicated that although a single lamella array system can work, there can be some difficulties with using such a system in water treatment plants. The system has the potential to suffer from a poor resin turndown ratio. Flow rate fluctuations of as little as 1 m/h can result in excessive expansion (>100% increase) or in a poor expansion (<1000 mm in height) of the resin throughout the process tank. Excessive expansion can significantly increase the resin loss rate, whilst poor expansion will impact on resin dispersal throughout the contact region and therefore the effectiveness of the ion exchange process. This can pose significant difficulties in water treatments plants as some variation in the flow rates can be expected and may be required such as during maintenance.

The tests also indicated that altering the amount of resin contained within the process tank can alter the operational range. However, large changes in the resin inventory are required, with a 50% change accommodating a 2 to 3 m/h change in flow rate.

The tests also indicated that changing resin inventory to one having different settling rate properties can provide at least an 1 µm/h variation in operational range, but such changes are unlikely to be viable in a commercial setting.

During operation of the system at rates greater than the optimal operational flow rate, the lamella plate array demonstrated an ability to restrict plume expansion to the bottom of the lamella array over a flow rate range of at least 9 m/h. Importantly, the trials indicated that it was still able to retain the bulk of the resin and therefore demonstrated an ability to guard against extreme resin loss rates.

It was also considered that mechanical agitation, flow rates and appropriate inlet design configuration can be used to increase the operational range of the system, by expanding and dispersing the resin within the upflow. However, the resultant turbulent flow patterns and eddy currents can affect the overall performance of the settling members and increase resin loss from the system.

Figure 8:
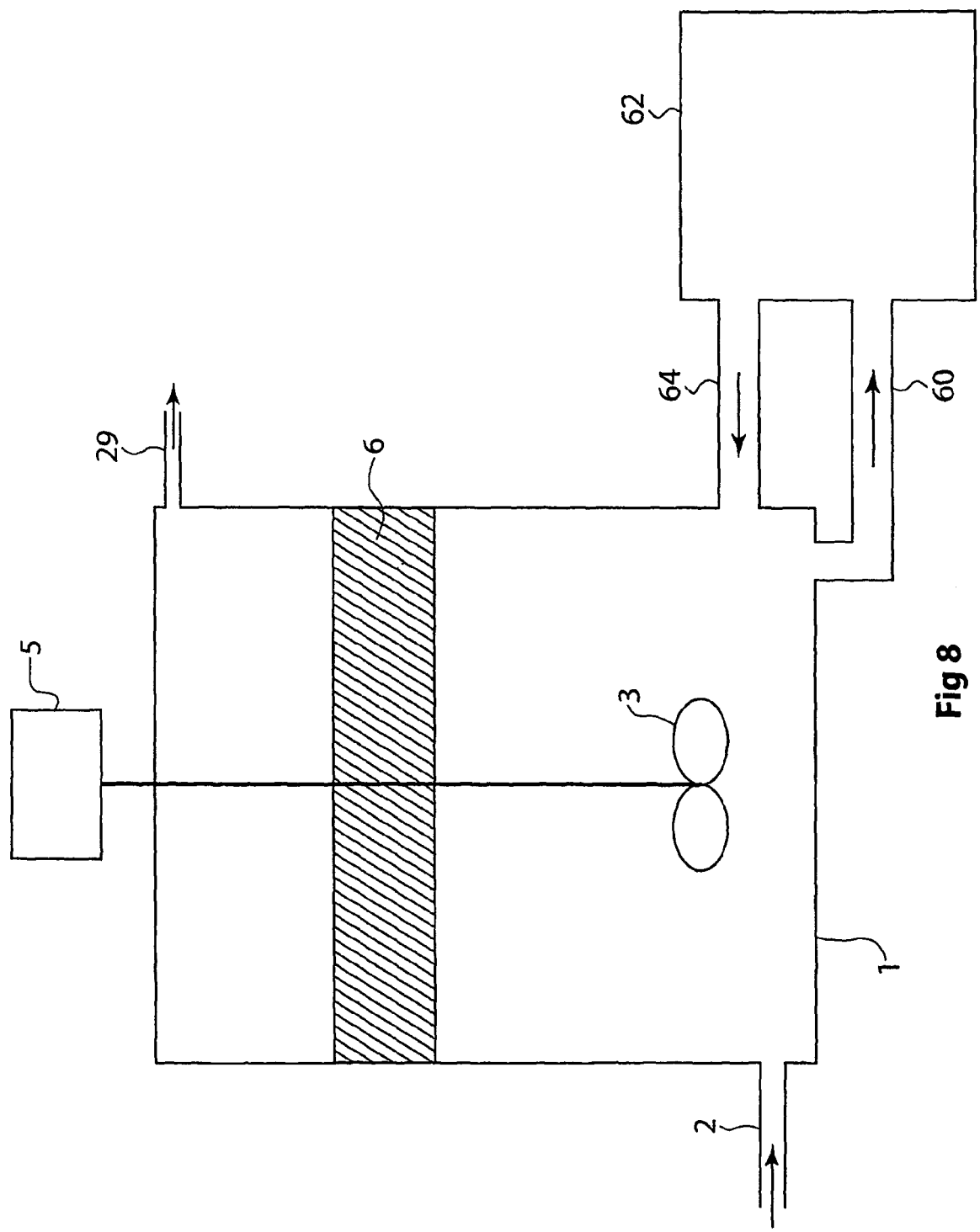
FIG. 8 is a schematic depiction of a process tank of the invention in combination with a regeneration system.

The method can be combined with other process steps or apparatus used in the treatment of the liquid. FIG. 8 depicts the combination of the process tank (1) having an inlet (2), agitator (3) and motor (5) and outlet (29). The tank includes settling members (6), such as an array of lamella plates. The tank also includes a resin outlet pipe (60) which resin can pass from the tank into a resin regeneration system (62). For MIEX® DOC resin a suitable regenerant is brine. The regenerated resin can be returned to the tank by resin inlet pipe (64). It is not necessary to regenerate all of the resin collected from outlet (60). A portion of the resin may be regenerated and the remainder returned to the process tank via the liquid inlet pipe (2), regenerated resin inlet (64) or another inlet pipe (not shown).

The resin regeneration system (62) may comprise any known resin regeneration system. In the simplest form it may comprise a tank in which the resin is soaked with a suitable regenerant before being rinsed and returned to the process tank. More complicated systems can be used and it is preferred to use a continuous flow system such as that described in WO 2005/105677. Plug flow systems can also be used such as that described in PCT/AU2005/001111. The contents of these patents are incorporated by cross-reference.

Figure 9:
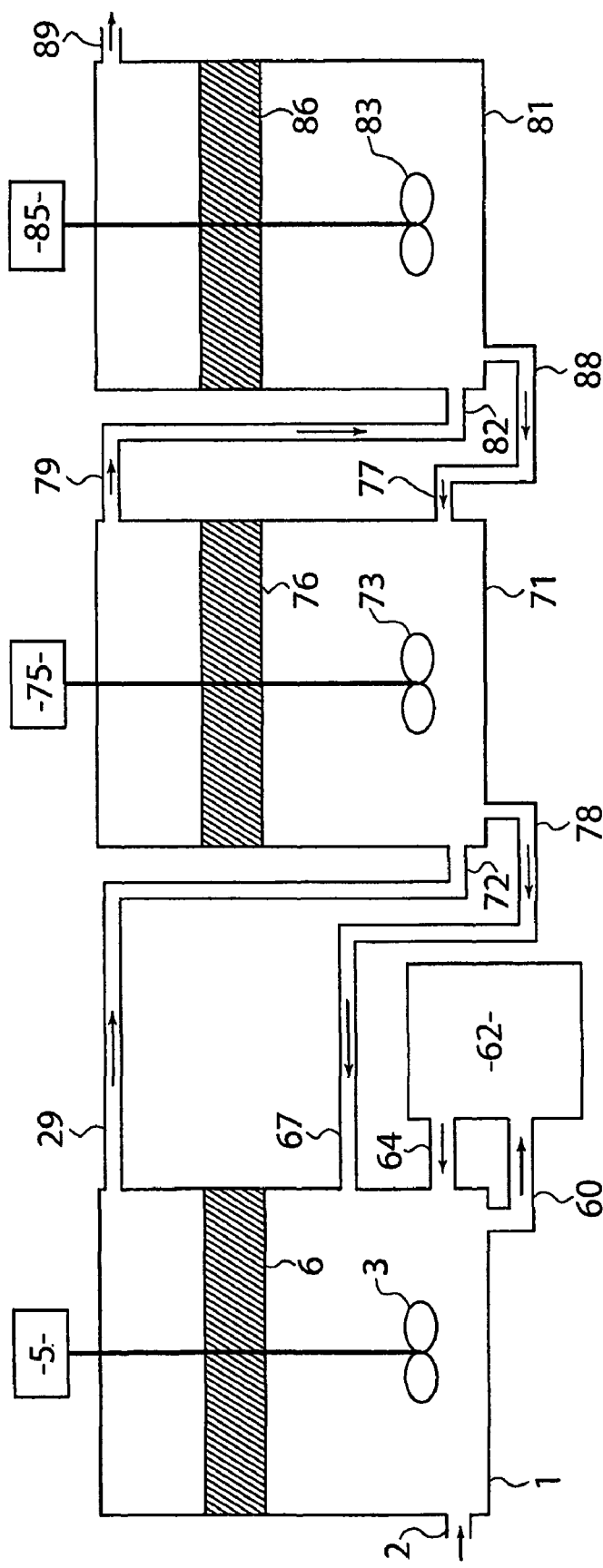
FIG. 9 is a schematic depiction of a series of process tanks of the invention in combination with a resin regeneration system.

FIG. 9 depicts another alternative which uses a series of process tanks. The first process tank (1) is substantially the same as that earlier described with reference to FIG. 8. It is in fluid communication with a regeneration system (62) for regeneration of a portion of the resin.

The outflowing stream of resin contacted liquid and any residual resin leaves the outlet (29) and passes into the inlet of the next process tank (71) of the series. The tank is fitted with an agitator (73), motor (75), settling members (76) and has an outlet (79). Residual resin present in the inflowing liquid combines with resin in the tank and may be settled by passing through the settling member (76).

The outlet (79) is connected to a further process tank (81) via inlet (82). The tank includes an agitator (83), motor (85) and settling members (86). The resin contacted liquid flows out via outlet (89). Any residual resin remaining in the stream of outflowing liquid may be captured by using a magnetic separator in the stream as earlier described.

The tanks include resin outlets (78) and (88) respectively connected to resin outlets (67) and (77). This allows resin to be pumped back from the downstream tanks into the upstream tanks.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form or suggestion that that prior art forms part of the common general knowledge in Australia.

It would be appreciated by a person skilled in the art numerous variations and/or modifications may be made to the invention as shown the specific embodiments without departing from the spirit or scope of the invention as broadly described. The present embodiments are, therefore, to be considered in all respects as illustrative and not restrictive.

The invention claimed is:

1. A method for contacting liquid with an ion exchange resin comprising introducing liquid into a process tank containing ion exchange resin at an inlet and removing liquid that has been contacted with resin from the process tank at an outlet, the outlet being located above the inlet, the process tank including a resin containment region disposed between the inlet and the outlet to impede the upward flow of resin as it becomes entrained in the liquid flowing from the inlet to the outlet, and a contactor region for promoting contact between the resin and the liquid located below the containment region, said containment region containing an array of settling members through which the liquid and resin upflow and which impede the flow of the resin to a sufficient extent that it is substantially contained within or below the containment region, wherein the process tank is in fluid communication with a resin regeneration system whereby resin can be removed from the process tank and at least a portion of the resin subjected to a regeneration process before the regenerated resin is returned to the contactor region of the process tank.

2. The method according to claim 1 wherein the resin has a density greater than the liquid.

3. The method according to claim 2 wherein the resin has a density at least 10% greater than the liquid.

4. The method according to claim 2 wherein the resin has a density at least 15% greater than the liquid.

5. The method according to claim 1 wherein the resin is magnetic ion exchange resin.

6. The method according to claim 5 wherein the resin is a macroporous ion-exchange resin having magnetic particles dispersed throughout the resin.

7. The method according to claim 5 wherein the settling members are arranged to promote agglomeration of the magnetic ion exchange resin.

8. The method according to claim 1 wherein the settling members are lamella plates, inclined plates, settling tubes or both.

9. The method according to claim 1 wherein the process tank includes one or more additional arrays of settling members within the containment region upstream from the array of settling members and which assist in containing the resin within or below the containment region.

10. The method according to claim 1 which includes an additional step of capturing residual resin carried through the outlet by an outflowing stream of resin contacted liquid.

11. The method according to claim 10 wherein the stream of the resin contacted liquid from the outlet is passed through a magnetic field provided by permanent magnets located within the stream.

12. The method according to claim 11 which includes a further step of releasing any resin retained by the magnetic field of the permanent magnets and capturing the released resin.

13. The method according to claim 12 wherein the residual magnetic resin is separated from the liquid stream of resin contacted liquid by locating a contact surface within the stream, locating permanent magnets behind the contact surface which provide a magnetic field that extends through the contact surface and into the stream and which is capable of attracting and retaining magnetic resin onto the contact surface and where the magnetic field can be reduced or removed in response to an actuation means so as to release resin retained on the contact surface.

14. The method according to claim 13 wherein the magnetic field is reduced or removed by moving the magnet away from the stream contact surface.

15. The method according to claim 1 wherein the liquid is water.

\* \* \* \* \*